May 17, 1949.  A. C. HALL  2,470,099
SERVOMECHANISM
Filed Oct. 31, 1944

INVENTOR.
Albert C. Hall
BY Melvin R. Jenney
Atty.

Patented May 17, 1949

2,470,099

UNITED STATES PATENT OFFICE 2,470,099

SERVO MECHANISM

Albert C. Hall, Boston, Mass., assignor, by mesne assignments, to Research Corporation, New York, N. Y., a corporation of New York Application October 31, 1944, Serial No. 561,312

7 Claims. (Cl. 121—41)

The present invention relates to servomechanisms and more particularly to means for improving the transient and steady state responses thereof.

In my copending application Serial No. 560,184, filed October 24, 1944, I have disclosed certain apparatus known as lead controllers for improving the transient response of the servo. Briefly, the lead controller operates to introduce a phase lead to compensate for the various lag-producing elements which inherently exist in any servo-mechanism.

It is also possible to provide what is termed integral control. The purpose of integral control is to improve the steady state response. In a particular case the error between input and output under constant velocity conditions may be wholly or partly eliminated by use of integral control. The use of integral control in the servo is to some extent inconsistent with the use of lead control since integral control produces a phase-lag in the output with relation to the input.

The object of the present invention is to combine integral and lead controllers which will satisfactorily improve both the steady state and transient operation of the servomechanism. In carrying out my invention I provide a simple network which introduces a phase lead at high frequencies and a phase lag at low frequencies. The constants of the network may be so chosen, as will hereinafter appear, that the lead at high frequencies affords adequate improvement in transient response while the lag introduced at low frequencies reduces the steady state error. In the simplest form of the invention the networks are electrical in character but mechanical types may also be provided and both forms are hereinafter described.

Figure 1:
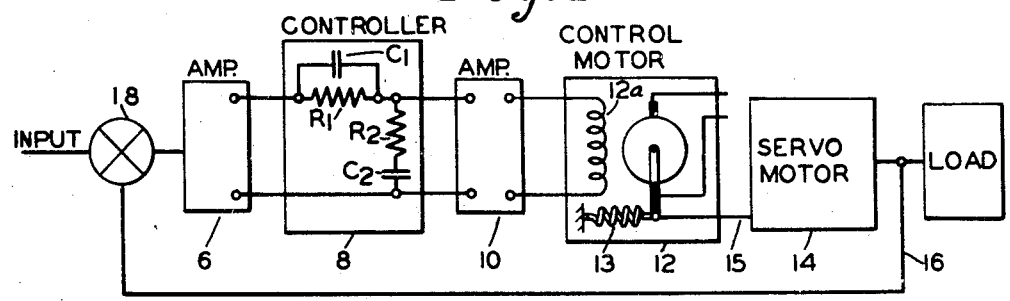
Figure 2:
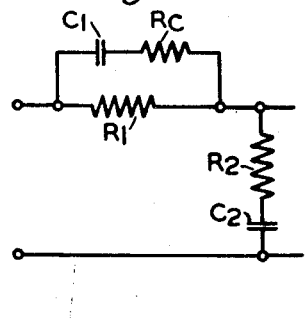
Figure 3:
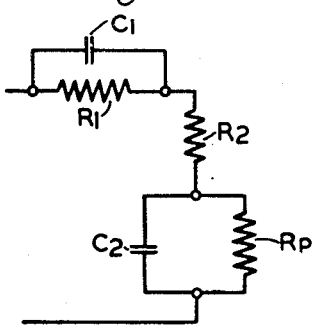
Figure 4:
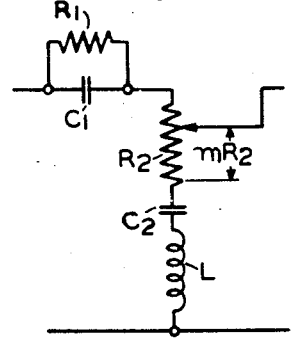
Figure 5:
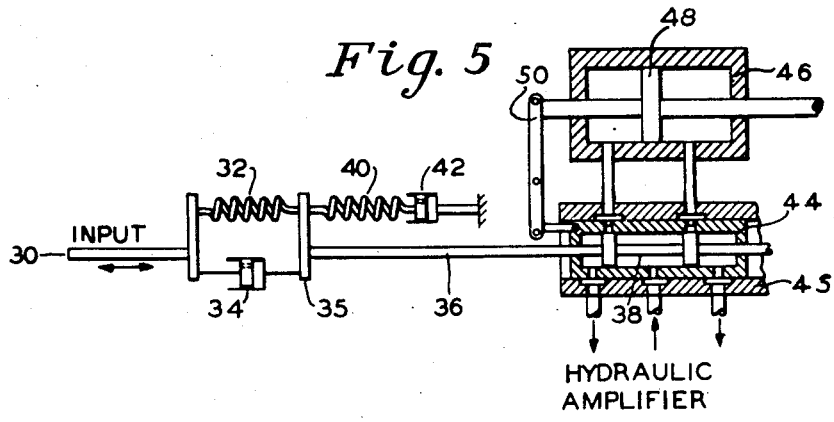

In the accompanying drawings Fig. 1 is a diagram of a simple form of servomechanism having a combined lead and integral controller according to the present invention. Figs. 2, 3 and 4 are diagrams of modified forms of controllers and Fig. 5 is a diagram of a mechanical controller operating according to the principles of the present invention.

The characteristics of lead control devices are given in my copending application. The simplest realizable form of lead control device has a transfer function as follows:

$$\frac{j\omega+c}{j\omega+\alpha c} \quad (1)$$

where $\omega$ is angular frequency and $\alpha$ the attenuation factor. The term $c$ depends on the constants of the device. This expression gives the ratio of output to input. In an electrical lead controller, it is a voltage ratio, and in a mechanical type, it is a ratio of displacements.

The lead control device has the property of attenuating low frequencies more than high frequencies; thus at zero frequency the attenuation is $\alpha$, but at infinite frequency there is no attenuation. The effect of a lead controller is to introduce a phase-lead and thereby to compensate partly for the lag-producing elements of the servo. The greater the attenuation, the greater will be the compensation, and the more will the transient response of the servo be improved. It must be kept in mind that the attenuation must be made up by suitable amplification. As shown in my copending application, there are both theoretical and practical limits to the allowable attenuation, but within those limits the factor $\alpha$ may be chosen at will, preferably as large as possible.

For further discussion, (1) is converted to the form $$\frac{K_1}{\alpha_1}\frac{1+\tau_1\alpha_1 s}{1+\tau_1 s} \quad (2)$$

where the amplification factor $K_1$ of an associated amplifier has been introduced, the Laplacian operator $s$ has been substituted for $j\omega$, and the quantity $\tau$ has been used to designate the time constant of the lead controller. The subscripts are here used to distinguish from the integral controller to be presently described.

While the purpose of a lead-controller is to improve the transient response, the purpose of an integral controller is to improve steady-state operation at constant velocity. The transfer function of an integral controller is $$K_2\frac{1+\tau_2 s}{1+\alpha_2\tau_2 s} \quad (3)$$

In this case $\alpha_2$ is the factor by which high frequencies are attenuated. Thus, taking account of both the amplification ratio and the attenuation, the ratio of output to input is $K_2$ at zero frequency and $K_2/\alpha_2$ at infinite frequency. If $$\frac{K_2}{\alpha_2}=1$$

and both $K_2$ and $\alpha_2$ approach infinity, a result which can be attained by the use of regenerative amplifier, the servo will have zero error under constant velocity conditions. In most applications, complete elimination of error under constant-velocity conditions is not necessary, and satisfactory reduction of error can be attained with finite values of gain and attenuation factor.

In order to obtain the desirable result of improved transient and constant-velocity response, the present invention comprises a system of the type shown in Fig. 1. The system comprises an amplifier 6, a control network 8, a second amplifier 10, a control motor 12, and a servo or driving motor 14 which drives the load. The control motor has a field winding 12a, and its rotor is constrained by a spring 13. The rotor is connected to a member 15 which controls the output of the servomotor 14, whereby an angular displacement of the rotor varies the speed of the servomotor. A "feed-back" link 16 leads from the output through a differential device 18 back to the input.

Although the system shown in Fig. 1 may comprise electrical, mechanical or hydraulic components, or various combinations thereof, it will be convenient to assume that the amplifiers 6 and 10 have a constant total gain $K_p$ at all frequencies, that the control motor 12 is an electric motor having a torque proportional to the amplifier output, and that the servomotor 14 is a hydraulic motor in which the output velocity is instantly proportional to the displacement from neutral of a member 15 controlled by the motor 12. These simplifying assumptions are not limitations on the inventions to be described but are made only for the purpose of simplifying the explanation of the system. The feed-back link 16 and differential 18 may be any device for comparing the output and input quantities, to subtract the output angle from the input angle to give the error. Suitable electrical devices for this purpose are as shown in the Brown and Forrester Patent Number 2,409,190, dated October 15, 1946.

The controller 8 comprises parallel capacitance and resistance designated $C_1$ and $R_1$ in series with the amplifier output, and series capacitance and resistance $C_2$ and $R_2$ across which the input of the second amplifier is connected. The purpose of using two amplifiers is to provide "buffers" on each side of the controller 8, whereby its transfer-function may be considered independently of the devices with which it is connected.

The transfer function of the controller 8, that is, the ratio of its output to input voltage is $$K_p \frac{R_1 R_2 C_1 C_2 s^2 + (R_1 C_1 + R_2 C_2) s + 1}{R_1 R_2 C_1 C_2 s^2 + (R_1 C_1 + R_2 C_2 + R_1 C_2) s + 1} \quad (4)$$

Equation 4 is identical with the product of (2) and (3) if $$\alpha_1 = \alpha_2 = \alpha$$
$$R_1 R_2 C_1 C_2 = \alpha \tau_1 \tau_2$$
$$R_1 C_1 + R_2 C_2 = \alpha \tau_1 + \tau_2$$
$$R_1 C_1 + R_2 C_2 + R_1 C_2 = \tau_1 + \alpha \tau_2$$
$$K_p = \frac{K_1 K_2}{\alpha}$$

Thus, in a single network, it is possible to obtain the effect of a single-stage lead controller of attenuation $\alpha$ and an integral controller likewise of attenuation $\alpha$. Furthermore, it will be noted that the total required amplification is less by a factor $\alpha$ than would be required if separate lead and integral controllers were used.

It will be observed from (4), that the ratio of output to input voltage of the controller 8 is $K_p$ for zero and infinite frequencies and is less than $K_p$ for all intermediate frequencies. For frequencies less than $$\frac{1}{\sqrt{\alpha \tau_1 \tau_2}}$$

the output has a phase lag, and at higher frequencies it has a phase lead with respect to the input. The attenuation constant is chosen with regard to the amplification that can be economically provided. $\tau_1$ is then selected to make the natural frequency of the system as high as possible, and $\tau_2$ is made as small as possible without adversely affecting stability. It is to be noted that $\tau_2$ must be greater than $\tau_1$. In order to effect neutralization of the lag-producing elements of the servo, the controller must introduce a phase-lead at the natural frequency of the servo. Thus the frequency represented by $$\frac{1}{\sqrt{\alpha \tau_1 \tau_2}}$$

must be less, and preferably is substantially less than the natural frequency of the uncompensated system. The actual engineering calculations are preferably carried out as described in my technical paper "The Analysis and Synthesis of Linear Servomechanisms," published by Technology Press, Cambridge, Massachusetts. After selection of the $\alpha$ and $\tau$ values, any one of the R and C values may be arbitrarily chosen and the rest may be calculated from the foregoing relations.

The network shown in Fig. 1 requires that the attenuation factors for the lead and integral controls shall be equal. In some instances it is required that they shall be unequal. For example, since increased $\alpha_1$ (with appropriate increase in gain) increases the high frequency response, a limit may be imposed on $\alpha_1$ by the presence of high frequency perturbations (tracking errors, etc.). Yet it is desirable to have the integral control attenuation factor $\alpha_2$ as large as possible to effect a large reduction of steady-state error. This can be accomplished by the control network of Fig. 2, which differs from that of Fig. 1 only by the addition of a resistance $R_c$ in series with the condenser $C_1$. The transfer-function of this network is as follows:

$$K_p \frac{R_2 C_2 (R_1 + R_c) C_1 s^2 + [R_2 C_2 + (R_1 + R_c) C_1] s + 1}{[R_2 C_2 (R_1 + R_c) C_1 + R_1 R_c C_1 C_2] s^2 + [R_2 C_2 + (R_1 + R_c) C_1 + R_1 C_2] s + 1} \quad (5)$$

If the circuit parameters are chosen so that $$K_p = \frac{k_d k_i}{\alpha_d} = k_{s2}$$
$$\alpha_1 \tau_1 \tau_2 = R_2 C_2 (R_1 + R_c) C_1$$
$$\alpha_2 \tau_1 \tau_2 = R_2 C_2 (R_1 + R_c) C_1 + R_1 R_c C_1 C_2$$
$$\tau_2 + \alpha_1 \tau_1 = R_2 C_2 + (R_1 + R_c) C_1$$
$$\alpha_2 \tau_2 + \tau_1 = R_2 C_2 + (R_1 + R_c) C_1 + R_1 C_2$$

lead control with attenuation $\alpha_1$ and integral control with attenuation $\alpha_2$ will result.

In some instances it is desirable to provide a controller in which the attenuation factor for the lead control is greater than that for the integral control. This situation may arise where a marked improvement in transient response is required and a large amount of integral control cannot be tolerated because of reasons of stability. In such a case the controller shown in Fig. 3 may be used in which a resistance $R_p$ is connected across the condenser $C_2$. The expression for the transfer function is similar in form to (5); it can be easily deduced and the values of the constants can be readily determined in the manner heretofore indicated.

It has been shown in my prior application that lead controllers of higher degree are frequently of benefit, particularly if they contain lead-producing elements which individually match the lag-producing elements of the servomechanism. In particular a second degree lead controller was there described having a transfer function of the following form:

$$\frac{s^2 + 2Z\omega_0 s + \omega_0^2}{s^2 + 2nZ\omega_0 s + \alpha_0^2 \omega_0^2} \tag{6}$$

It was also shown in my prior application that in the case of a third-order servo the natural frequency $\omega_0$ and the damping factor $Z$ of the lead controller are preferably selected to accord with the natural frequency and the damping factor respectively of the servomechanism in which case an expansion of the frequency scale by a factor $\alpha_0$ would be obtained. In the application of such a network to a servomechanism of higher order, the constants would be preferably so chosen as to compensate for the lag-producing elements of lowest natural frequency. In a controller of this type the factor $n$ may be arbitrarily chosen between certain limits to bring the damping factor of the whole system to a desired value.

The network in Fig. 4 comprises a combined integral and lead controller in which second degree lead control is obtained in accordance with the principles set forth in my prior application. This controller is similar to that shown in Fig. 1 except that an inductance $L$ is included in the output leg. The output voltage may be varied by a sliding contact on the resistor $R_2$ whereby a certain proportion $m$ of the voltage across the resistor is included in the output voltage.

The transfer function of this controller is as follows:

$$\frac{LR_1 C_1 s^3 + (L + mR_1 R_2 C_1) s^2 + \left(R_1 \frac{C_1}{C_2} + mR_2\right) s + \frac{1}{C_2}}{LR_1 C_1 s^3 + (L + R_1 R_2 C_1) s^2 + \left(R_1 \frac{C_1}{C_2} + R_1 + R_2\right) s + \frac{1}{C_2}} \tag{7}$$

which may be factored into the product of two expressions similar in form to (3) and (6) if $\alpha_1 = \alpha_0^2$. Thus the network may be constructed to produce lead and integral control, each with attenuation factor $\alpha_1$. The constants are preferably chosen with relation to those of the uncompensated servo in accordance with the principles outlined in my prior application to obtain the optimum expansion of frequency scale.

It will be understood that although mention has been made of certain effects occurring at infinite frequency, the output of any physical device at infinite frequency is necessarily zero, because of distributed capacitances and other parasitic effects. However, the frequency range in which a servomechanism operates is low enough so that these effects need not be accounted for, and the mathematical expressions herein given may be considered to represent the physical actions with sufficient accuracy.

The lead and integral controllers described above are electrical "networks" but mechanical networks can also be used. An example of a mechanical controller identical in result with that of the electrical controller of Fig. 1 is given in Fig. 5.

In Fig. 5 the input to the controller (which is the error between input and output displacements of the complete system) is applied to the link 30 which is arranged to slide back and forth. The link is connected through a parallel spring 32 and dashpot 34 to a crosshead 35, which in turn is connected by a rod 36 with the pilot piston valve 38 of a hydraulic amplifier. The crosshead 35 is connected through a spring 40 to a dashpot 42 mounted on a suitable fixed support.

The hydraulic amplifier is of conventional form such as shown in the above-mentioned Brown and Forrester patent. The pilot piston valve 38 slides in a sleeve 44 which, in turn, is movable within a cylinder 45. Suitable piping connections are run to a power cylinder 46, within which slides a power piston 48. The piston 48 is connected to the sleeve 44 through a repeat-back link 50, whereby, upon a displacement of the valve 38, the power piston is caused to undergo an amplified motion which is utilized for control of the servo motor, all as described in the Brown and Forrester patent.

Let the spring constants of springs 32 and 40 be $k_1$ and $k_2$ respectively, and the damping coefficients of dashpots 34 and 42 be $f_1$ and $f_2$ respectively. Then the ratio of output to input displacements, namely, the ratio of displacement of piston valve 38 to displacement of input link 30 is given by the following transfer function $$\frac{f_1 f_2 s^2 + (f_1 k_2 + f_2 k_1) s + k_1 k_2}{f_1 f_2 s^2 + (f_1 k_2 + f_2 k_2 + f_2 k_1) s + k_1 k_2} \tag{8}$$

which is identical in form to (4) above. This system may therefore be used to provide lead control and integral control in a system having mechanical components only.

Upon a slow motion of the input rod 30 either to right or left the dashpots 34 and 42 interpose no substantial resistance to the motion, the springs 32 and 40 are not called upon to transmit any appreciable force and hence the rod 36 moves the same amount as the rod 30. On the other hand, for an extremely rapid motion of the input 30, the dashpot 34 becomes effectively locked and it transmits the motion of the input 30 direct to the rod 36. These conditions correspond respectively to very low and very high values of $s$ in the expression (8) and in each case the attenuation through the mechanical network is substantially zero. On the other hand, for intermediate conditions the dashpots 34 and 42 only partially resist the motion and it can be seen that the motion of the rod 36 in either direction is less than that of input 30. Thus the middle frequency range is attenuated.

It will be understood that other types and forms of networks may be used to provide combined lead and integral control in accordance with the principles of equivalent networks. Furthermore regenerative amplifiers may be used in which case the control in networks may be placed either in the direct path or in the feed-back path.

Having thus described my invention, I claim:
1. A servomechanism having input means, output means, error-measuring means responsive to instantaneous differences between the input means and the output means for generating an error signal as a function of said differences, an amplifier through which the error signal is fed from the input means to the output means, and a compensating system comprising a high- and low-pass filter for operating on the signal to produce a phase-lag at low frequencies for integral control and a phase-lead at frequencies above a predetermined frequency to partially compensate for lag-producing elements of the servomechanism.

2. A servomechanism having input means, output means, error-measuring means responsive to instantaneous differences between the input means and the output means for generating an error signal as a function of said differences, an amplifier through which the error signal is fed from the input means to the output means, and a compensating system comprising a high- and low-pass filter for operating on the signal to produce a phase-lag at low frequencies for the integral control and a phase-lead at frequencies above a predetermined frequency to partially compensate for lag-producing elements of the servomechanism, the compensating system having a transfer-function represented by the product of terms of the form $$\frac{1+\tau_1\alpha_1 s}{1+\tau_1 s} \text{ and } \frac{1+\tau_2 s}{1+\tau_2\alpha_2 s}$$

where $s$ is a term representing frequency, and the $\tau$ and $\alpha$ terms are the time constants and attenuations of the lead and integral controls, respectively.

3. A servomechanism having input means, output means, error-measuring means responsive to instantaneous differences between the input means and the output means for generating an error signal as a function of said differences, an amplifier through which the error signal is fed from the input means to the output means, and a compensating system comprising a high- and low-pass filter for operating on the signal to produce a phase-lag at low frequencies for integral control and a phase-lead at frequencies above a predetermined frequency to partially compensate for lag-producing elements of the servomechanism, the compensating system having a transfer-function represented by the product of the terms of the form $$\frac{s^2+2Z\omega_0 s+\omega_0^2}{s^2+2nZ\omega_0 s+\alpha_0^2\omega_0^2} \text{ and } \frac{1+\tau_2 s}{1+\tau_2\alpha_2 s}$$

where $s$ is a term representing frequency, $Z$ and $\omega_0$ are the damping factor and natural frequency for lead control, $n$ is an arbitrary term, $\tau_2$ is the integral control time constant.

4. A servomechanism having input means, output means, error-measuring means responsive to instantaneous differences between the input means and the output means for generating an error signal as a function of said differences, an amplifier through which the error signal is fed from the input means to the output means, and a compensating system for operating on the signal and comprising an electrical network to pass high and low frequencies and to attenuate intermediate frequencies, whereby a phase-lag is introduced at low frequencies for integral control, and a phase-lead is introduced at high frequencies to compensate for lag-producing elements of the servomechanism.

5. A servomechanism having input means, output means, error-measuring means responsive to instantaneous differences between the input means and the output means for generating an error signal as a function of said differences, an amplifier through which the error signal is fed from the input means to the output means, and a compensating system for operating on the signal and comprising an electrical network having parallel capacitance and resistance in one leg and series capacitance and resistance in another leg, the network operating to pass high and low frequencies and to attenuate intermediate frequencies, whereby a phase-lag is introduced at low frequencies for integral control, and a phase-lead is introduced at high frequencies to compensate for lag-producing elements of the servomechanism.

6. A servomechanism having input means, output means, error-measuring means responsive to instantaneous differences between the input means and the output means for generating an error signal as a function of said differences, an amplifier through which the error signal is fed from the input means to the output means, and a compensating system for operating on the signal and comprising an electrical network having parallel capacitance and inductance in one leg and series capacitance, resistance and inductance in another leg, the network operating to attenuate intermediate frequencies, to pass high frequencies for second-degree lead control and to pass low frequencies for integral control.

7. A servomechanism having input means, output means, error-measuring means responsive to instantaneous differences between the input means and the output means for generating an error signal as a function of said differences, an amplifier through which the error signal is fed from the input means to the output means, and a compensating system for operating on the signal having mechanical elements to pass high and low frequencies, and to attenuate intermediate frequencies, whereby a phase-lag is introduced at low frequencies for integral control, and a phase-lead is introduced at high frequencies to compensate for lag-producing elements of the servomechanism.

ALBERT C. HALL.

REFERENCES CITED

The following references are of record in the file of this patent:

UNITED STATES PATENTS

| Number | Name | Date |
|---|---|---|
| 2,020,847 | Mitereff | Nov. 12, 1935 |
| 2,206,695 | Guanella | July 2, 1940 |
| 2,233,415 | Hull | Mar. 4, 1941 |
| 2,409,190 | Brown et al. | Oct. 15, 1946 |